Dec. 17, 1935.    J. A. McGREW    2,024,298
AUXILIARY PROPULSION UNIT
Filed Nov. 5, 1932    5 Sheets-Sheet 1
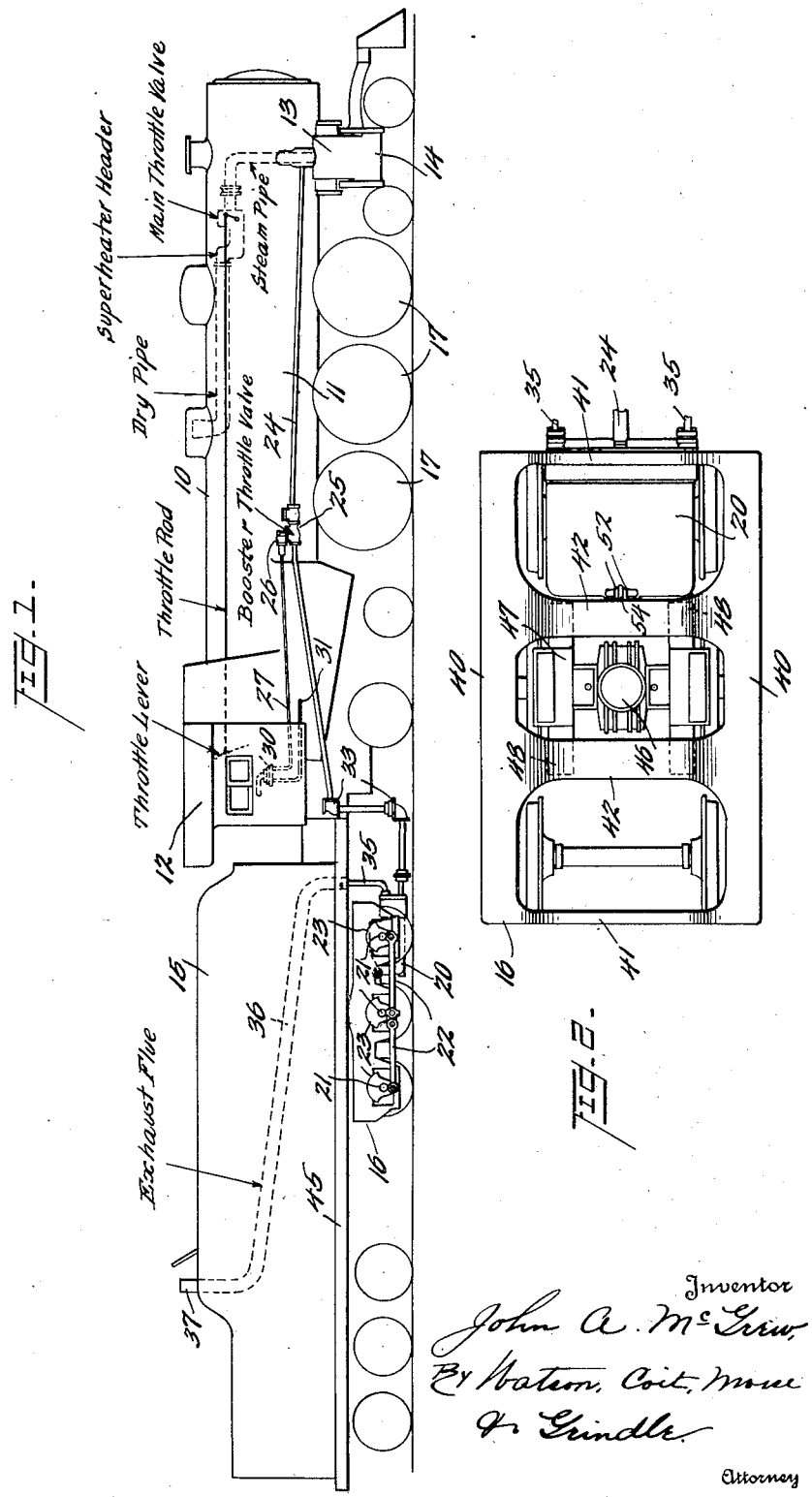

Dec. 17, 1935.   J. A. McGREW   2,024,298
AUXILIARY PROPULSION UNIT
Filed Nov. 5, 1932   5 Sheets-Sheet 2
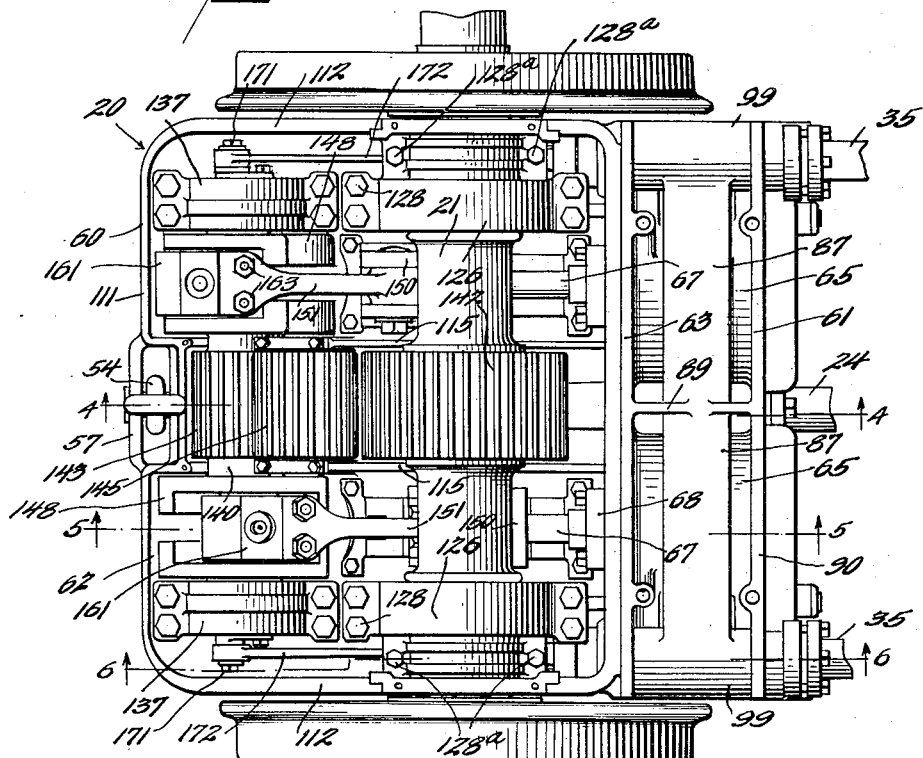
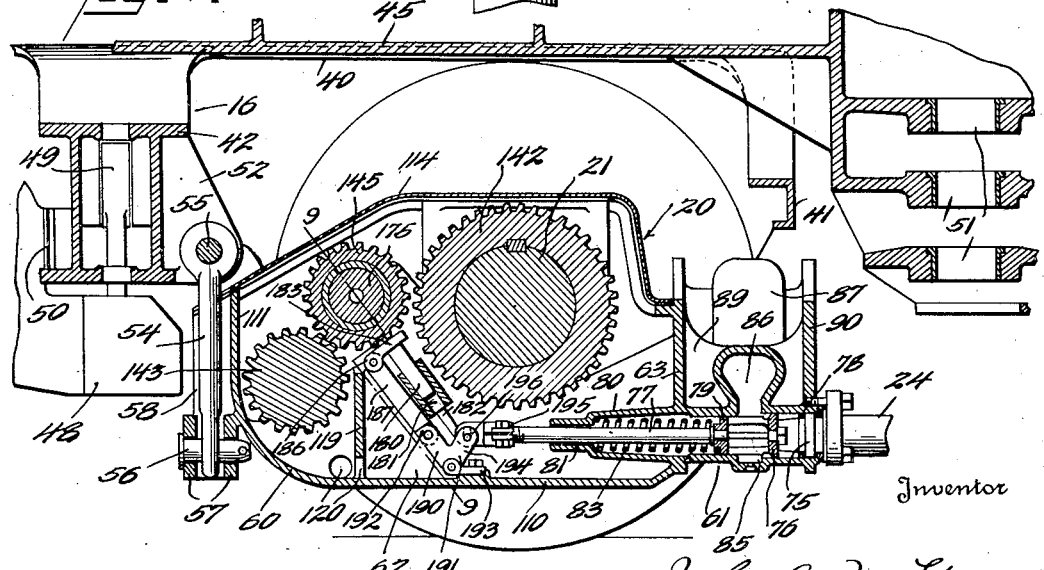
Inventor
John A. McGrew
By Watson, Coit, Morse + Grindle
Attorney Dec. 17, 1935.                    J. A. McGREW                    2,024,298
                            AUXILIARY PROPULSION UNIT
                              Filed Nov. 5, 1932          5 Sheets-Sheet 3
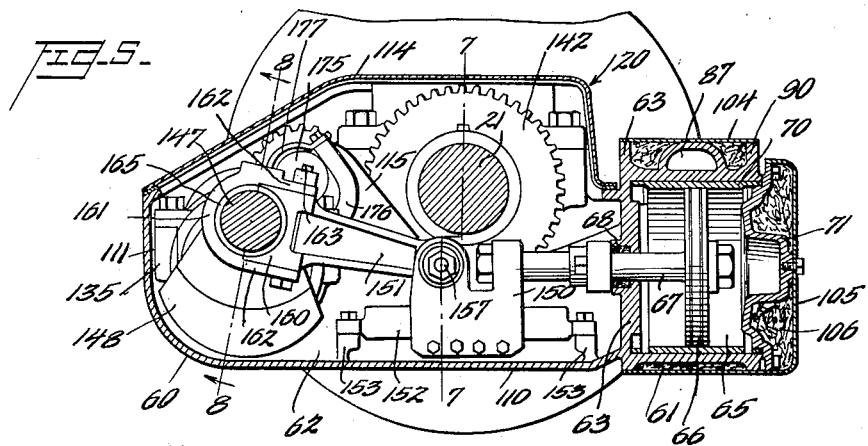
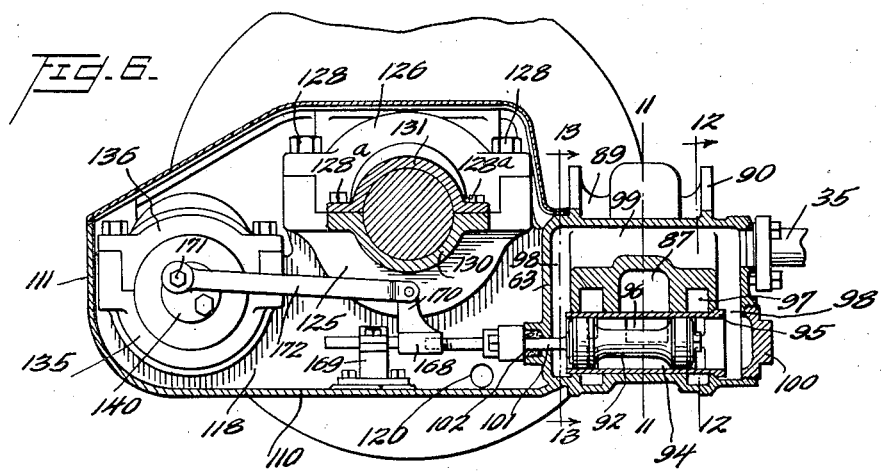
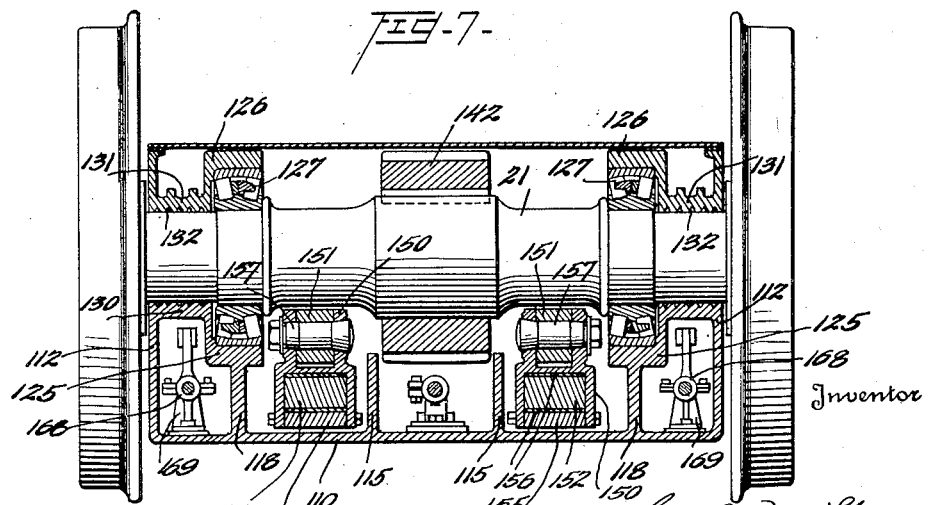

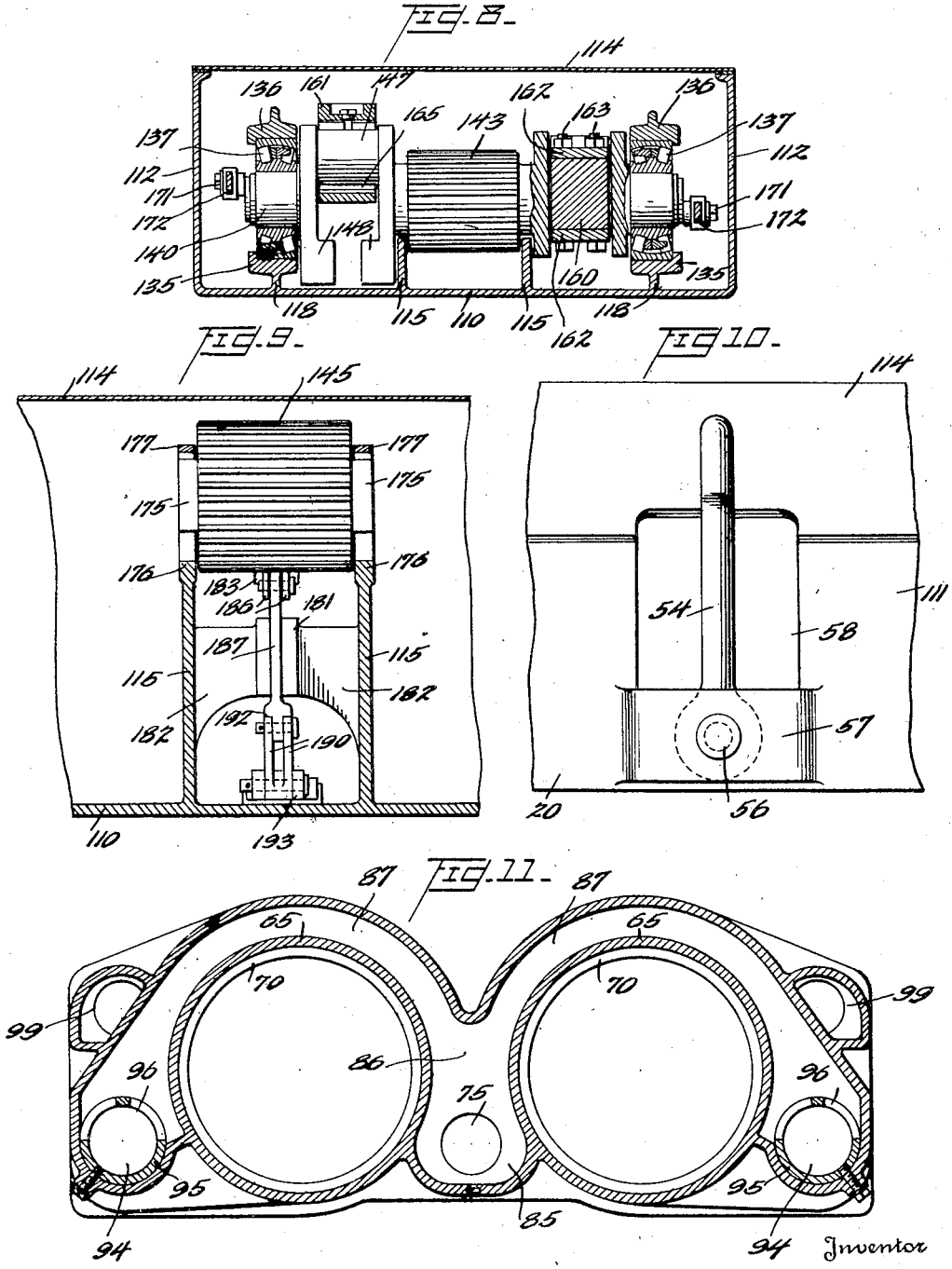

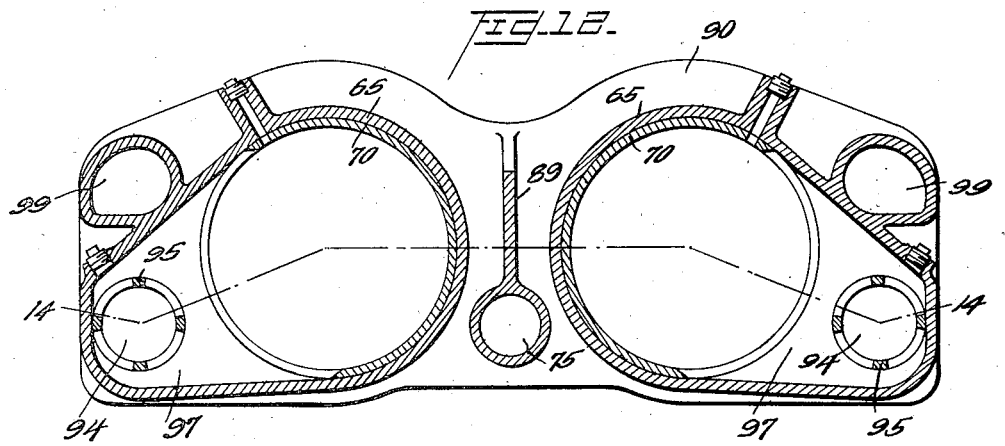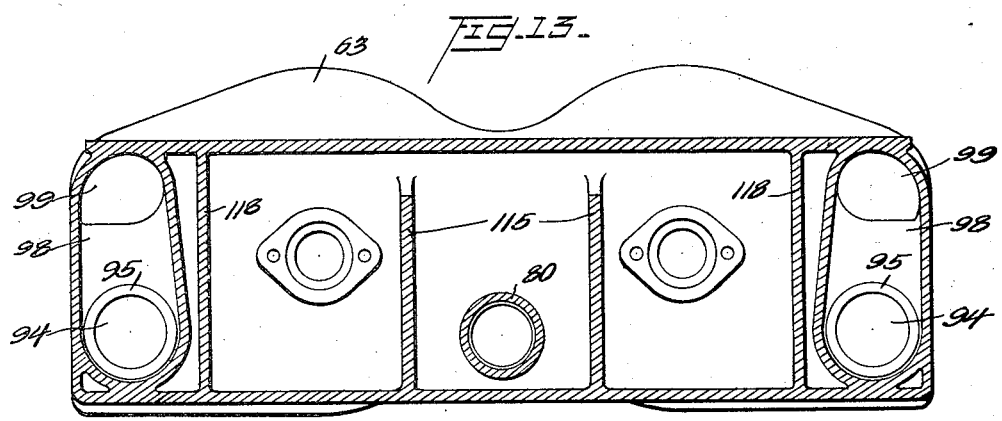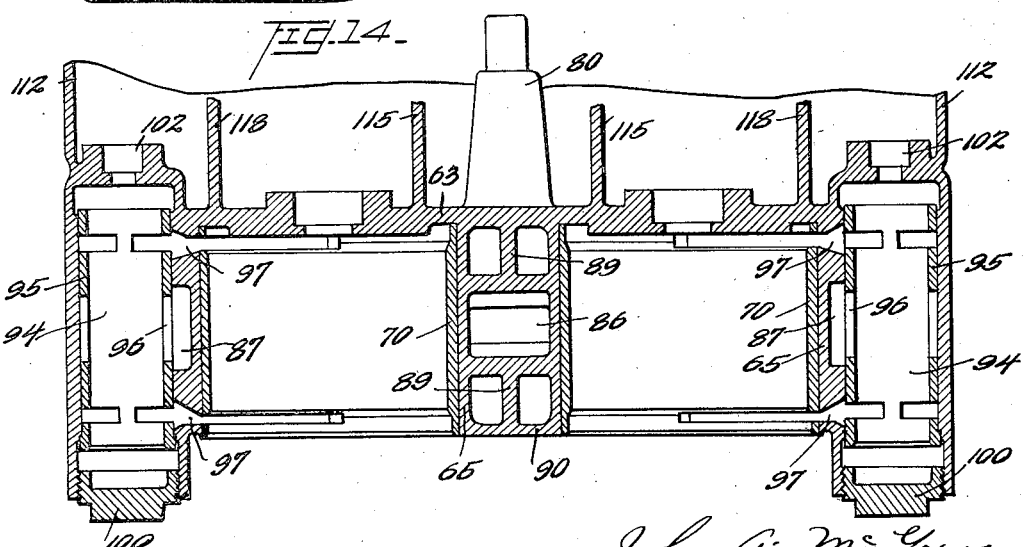

Patented Dec. 17, 1935

2,024,298

UNITED STATES PATENT OFFICE 2,024,298

AUXILIARY PROPULSION UNIT

John A. McGrew, Albany, N. Y.

Application November 5, 1932, Serial No. 641,451

39 Claims. (Cl. 105—48)

This invention relates to auxiliary propulsion units for locomotives and has for its general object the provision of a novel and improved unit of this description.

Auxiliary propulsion devices are commonly employed in connection with steam propelled railway locomotives for supplementing the power of the main engines thereof at certain times, as, for example, when starting and accelerating locomotives and their trains of cars, when drawing exceptionally heavy loads, or when climbing steep grades. One well-known type of auxiliary propulsion unit is designed and intended to drive an otherwise trailing axle of the locomotive proper, being carried by the trailer truck of the locomotive to which it is applied. In a second type the dead weight of the locomotive tender is utilized, the auxiliary propulsion unit being mounted upon a tender truck. However, in practically all cases in which auxiliary engines have been supported upon tender trucks, it has been necessary to extensively modify the details of construction of such trucks by increasing the spacing of the axles or by other changes involving the design or arrangement of the truck frames or bolsters.

With the constant increase in the size of locomotives and tenders and the utilization of swing-motion six-wheel tender trucks in connection therewith, the problem of supporting an auxiliary propulsion motor of the proper power upon a tender truck, within the relatively small space available, has become increasingly difficult. Furthermore, prior to the present invention, it was not considered feasible to mount an auxiliary propulsion unit upon a six-wheel truck of the swing-motion type, that is, one in which provision is made for the lateral motion of a bolster with respect to the truck frame. Such trucks are usually provided with longitudinally spaced transoms which are generally formed integrally with the truck frame. The swing bolsters are provided with forwardly and rearwardly extending depending arms, the ends of which are disposed beneath these transoms and occupy much of the space beneath the truck which could otherwise be utilized in positioning an auxiliary propulsion unit. It is one of the objects of the present invention to provide an efficient and powerful high-speed propulsion unit which, on account of its compact construction and arrangement of parts, is well adapted for application to such six-wheeled swing-motion tender trucks without modification or re-designing of the latter.

A typical auxiliary propulsion unit or booster comprises generally a two-cylinder engine adapted to be supplied with steam from the locomotive boiler through suitable articulated pipe connections, a crankshaft driven by the steam engine, a train of gears for operatively connecting the crankshaft to the axle of the truck when desired, means for controlling the steam supply to the engine, and means for effecting entrainment or disentrainment of the power transmission gearing. In the preferred embodiment of the present invention, the crankshaft is provided with a driving pinion which is capable of being operatively connected with a gear fixed on the truck axle by means of an idler or tumbler gear, the entrainment of which is accomplished mainly by gravity, the tumbler gear being held in disengaged position when the booster is idle by means of a novel form of detent which is adapted to be automatically withdrawn when steam is supplied to the engines of the auxiliary propulsion unit.

The invention further contemplates the provision of a one-piece crank and pinion shaft which permits the employment of roller bearings and of engine cylinders of maximum diameter within the clearances available between the wheels.

Numerous other features of novelty are included in the improved auxiliary propulsion unit, one embodiment of which is illustrated in the accompanying drawings by way of example.

In the drawings:

Figure 1 is a general view in side elevation of a locomotive and tender to which my novel auxiliary propulsion unit has been applied;

Figure 2 is a somewhat diagrammatic plan view of a tender truck, illustrating the clearances between the auxiliary unit and the swing bolster and other portions of the truck;

Figure 3 is a plan view of the unit with the cover removed;

Figure 4 is a central, longitudinal, sectional view taken on line 4—4 of Figure 3;

Figure 5 is a longitudinal sectional view taken on line 5—5 of Figure 3;

Figure 6 is also a view in longitudinal section and is taken on line 6—6 of Figure 3;

Figure 7 is a view in transverse section through the axle bearings and taken on line 7—7 of Figure 5;

Figure 8 is a transverse sectional view taken on line 8—8 of Figure 5;

Figure 9 is a fragmentary cross-sectional view taken on line 9—9 of Figure 4 and showing the idler gear and its releasable support;

Figure 10 is a fragmentary view showing in rear elevation the means for supporting the unit from a transom of the truck;

Figures 11, 12, and 13 are vertical, transverse, sectional views through the cylinders of the engine and taken on lines 11—11, 12—12, and 13—13 of Figure 6; and Figure 14 is a horizontal sectional view through the cylinders taken on line 14—14 of Figure 12.

In the general view (Figure 1 of the drawings) the numeral 10 designates a locomotive which may be of any type or class and which is provided with the usual boiler 11, cab 12, and main engines comprising the steam chest 13 and cylinders 14 for actuating the driving wheels 17. Certain of the steam supply means for the main engines of the locomotive are also somewhat diagrammatically shown in Figure 1 and are designated by suitable legends. These elements include the usual dry pipe, superheater header, forward main throttle valve, steam pipes, throttle rod, and engineer's main throttle lever.

The locomotive tender is designated by the numeral 15 and is provided with six-wheeled lateral motion or swing motion trucks, the forward one of which is shown at 16 and is adapted to support the auxiliary propulsion unit 20. The three axles 21 of the truck are operatively associated by means of the connecting rods 22 and the counterbalanced cranks 23.

The auxiliary propulsion unit 20 is supplied with steam by means of the steam supply line 24 which taps the main steam pipe at a point preferably between the main locomotive throttle valve and steam chest on one or both sides of the locomotive. In this steam line 24 is disposed the booster throttle valve 25 which is controlled by an air motor 26 supplied with compressed air through the piping 27 controlled by the engineer's valve 30 in the cab. This throttle valve and actuator may be of any suitable type such as, for example, a Bradford throttle valve, which is illustrated in the "Locomotive Cyclopedia" of 1930 at page 351. The pipe 31 leads from the main air reservoir of the locomotive. The steam supply line 24 leading to the auxiliary unit is provided with suitable swiveled or pivoted joints 33 between the locomotive and the tender in order to partake of the relative movements of these vehicles when rounding curves and in similar circumstances.

The exhaust from the auxiliary propulsion unit engine is directed through the pipes 35, toward the lower mouths of the flues 36 which pass through the water space of the tender and may discharge upwardly at the rear end thereof as at 37, there being two exhaust pipes 35 and also two flues 36 passing through the tender, the exhaust pipes being located at opposite sides of the unit and the flues at opposite sides of the tender.

The novel means for suspending the locomotive propulsion unit from the truck will now be described. This suspension means is most clearly shown in Figures 2, 4, and 10 of the drawings. The truck 16 comprises essentially an integral substantially rectangular frame which includes the side frames 40, end beams 41, and the transoms 42. The tender frame, which in modern practice comprises a one-piece casting extending from end to end of the tender, is indicated at 45 in Figure 1, and a fragmentary cross-sectional illustration of this frame appears in Figure 4 of the drawings. The tender frame 45 is supported upon the center bearing 46 carried by the swing bolster 47 which is provided with the forwardly and rearwardly extending arms 48 which, as shown in Figure 4, are also offset downwardly and terminate beneath the transoms 42. These swing bolster arms 48 are suspended by means of the links 49 from the transom, and a portion of the bolster is adapted to be guided in its lateral swinging motion as at 50, where suitable wear plates are provided.

As clearly shown in Figures 2 and 4, the forwardly projecting ends 48 of the swing bolster extend to a point approximately half-way between the middle and outside axles of the truck and thus limit the space in which an auxiliary propulsion unit can be disposed to a relatively small space in the vicinity of one of the outside axles. However, by reason of the novel arrangement and construction of the various elements of the propulsion unit which forms the subject matter of the present invention, this space is utilized to the greatest advantage, and the unit is applied to trucks of this description without modification thereof. This arrangement, as will be readily seen in Figure 4, also avoids conflict between the booster and the drawbar connections 51.

The auxiliary unit 20 is adapted to be mounted chiefly upon the forward axle 21 of the truck, and the rear end thereof is suspended from spaced webs 52, formed at the mid-portion of the transom 42, by means of the link 54. A pin 55 passes between the webs 52 for supporting the upper end of the link, and another pin 56 serves to pivotally connect the lower end of the link with the flanges 57 formed on the frame of the propulsion unit. A recess 58 is provided in the rear wall of the housing of the unit for receiving the link.

The auxiliary propulsion unit is provided with a preferably integrally cast frame 60 which may be conveniently considered as comprising the forward or steam end 61 and the intermediate and rearwardly disposed transmission bed frame 62, these two arbitrary divisions of the main frame being separated by the vertical transversely extending wall or partition 63. The steam or power end 61 of the unit is provided with the two cylinders 65 in which pistons 66 are adapted to reciprocate, the piston rods 67 passing through the wall 63 in which suitable stuffing boxes 68 are provided. Liners 70 are fitted within the cylinders 65 and are provided with the usual ports for the discharge of the steam into and from the cylinder. Cylinder heads 71 are bolted or otherwise secured to the ends of the cylinders.

The steam supply pipe 24 communicates with the auxiliary propulsion unit centrally thereof and leads directly into the control valve and motor chamber 75. A valve member 76 is disposed in this chamber and is carried by the reciprocating plunger 77. Suitable guiding portions 78 are formed on the valve 76, as is also a spring abutment 79. The chamber 75 extends rearwardly through the partition wall 63 as at 80 and is restricted at its rearward end 81 to provide a bearing for the reciprocating plunger 77. The rearward portion 80 comprises a spring chamber within which the coil spring 83 is disposed so as to exert a forward pressure on the valve member 76 and normally cause the valve member to occupy the forward end of the chamber 75.

A central enlargement 85 is provided in the valve and motor chamber 75 which is extended upwardly as at 86 and is divided into two curved oppositely extending conduits or chambers 87, which pass over the mid-portions of the cylinders 65, at the outer sides of which they communicate respectively with the steam valve chambers of the engine. It will be understood that, when steam pressure is admitted to the unit by the actuation of the auxiliary locomotive throttle 25, the piston control valve 76 will be moved rearwardly against the resistance of the spring 83 until the central enlargement 85 is placed in communication with the supply of steam entering the forward end of the chamber 75. This will, of course, admit steam to the chamber 86 and passageways 87 communicating with the engine valves.

An integral bracing web 89 serves to connect the casings of the various chambers 75, 85, and 86 with the partition wall 63 and the front wall 90 of the unit. The valve rod 77 extends rearwardly of the tubular bearing portion 81 and is connected to certain transmission controlling mechanism which will be described later.

The admission and exhaust of steam to the engine cylinders 65 are controlled by piston valves 92 which are adapted to reciprocate within the valve chambers 94, provided with suitable ported liners 95. As explained before, the steam passages 85 communicate with the steam cylinders centrally thereof as best shown at 96 in Figures 6 and 11. From the valve chambers 94 the steam, at the proper time in the cycle of operation, is admitted to the cylinders by way of one or the other of passageways 97. Exhaust passages 98 lead upwardly from the ends of the valve chambers to the exhaust chamber 99 with which the exhaust pipes 35 are connected, as shown in Figure 6. Removable heads 100 are provided for the valve chambers 94 and the valve rods 101 adapted to extend through the partition wall 63 which is provided with suitable stuffing box arrangements 102. The entire steam end 61 of the unit may be provided with thin metal covers such as shown at 104 and 105 in Figure 5, and, if desired, suitable lagging or insulating material may be disposed between the walls of the steam or power end 61 and these covers 104 and 105, as indicated at 106.

The bed frame 62, which is adapted to support and house the mechanism by which the power is transmitted from the engine to the axle of the truck, comprises a bottom wall 110, a rear wall 111 (in which the recess 58 is formed for accommodating the supporting link 54), and side walls 112. The partition 63 forms the front wall of this transmission compartment, and a cover plate 114 is provided and is preferably made of relatively thin metal. Vertical, longitudinally extending, parallel, inner webs 115 are formed integrally with the bed plate and serve to connect the end walls 63 and 111 to provide a stronger and more rigid construction as well as to provide certain compartments within the transmission housing for enclosing and supporting operative elements and to govern the distribution of the lubricant carried in these compartments. Between these inner webs or partitions 115 and the side walls 112 are the outer longitudinal webs 118. These webs serve to further subdivide the transmission housing and also provide strengthening members and supporting pedestals for the bearings within which the driven axle and the engine crankshaft are rotatably supported. A short transverse web 119 serves to join the inner webs 115 near the rearward ends thereof. Openings 120 are provided in the transverse web 119, in the rearward portions of the inner webs 115, and in the forward portions of the outer webs 118 for the flow of oil between the compartments into which the housing is divided by these webs.

One of the important features of novelty of the present invention is the disposition of the steam cylinders of the engines of the propulsion unit upon one side of the truck axle which is to be driven thereby, and the location of the transmission gear train upon the opposite side of the driven axle. Thus, the axle 21 passes transversely through the approximate center of the unit 20 and is received within bearings provided in the bed frame 62 of the unit. Semi-circular bearing pillows 125 are formed on the webs 118 and, together with the complementary bearing caps 126, form housings within which are disposed the roller bearing assemblies 127 within which the axle is adapted to rotate. The bearing caps 126 are secured to the pillows 125 as by means of the bolts 128. The side walls 112 of the bed plate and the bearing pillows 125 are united by the integral half sleeve 130 which, together with the similarly formed portion 131 of the bearing cap 126 secured by bolts 128ª, is adapted to enclose the axle 21 and to receive suitable packing, as at 132, for preventing the escape of lubricant from the housing. Rearwardly of the bearing pillows 125 are the pillows 135 which are provided with bearings caps 136 enclosing the roller bearing assemblies 137 within which the crankshaft 140 is adapted to be received.

To the central portion of the axle 21 there is splined the main or bull gear 142. The crankshaft 140 is disposed in parallel relation to the axle 21 and is provided with a driving gear portion 143 preferably formed integrally with the crankshaft and adapted to be placed in driving relation with the main gear 142 by means of the interposition of an idler or tumbler gear 145, the operation of which will be described hereinafter.

The crank and pinion shaft 140 is preferably of integral construction and is best shown in Figure 8 of the drawings. The driving pinion portion 143 is disposed between the walls 115 of the bed frame. Outwardly of this driving portion and adapted to move between the walls 115 and 118 on either side of the center are positioned the crank pin portions 147 which are counterbalanced by the weights 148 arranged in pairs and adapted to pass upon either side of the pitman or connecting rod which is operatively secured to the crank pin portion 147. Next in order outwardly along the crankshaft are the bearing portions which are received in the roller bearings assemblies 137.

Each piston rod 67 is secured to a cross head 150 which in turn is operatively connected with a crank pin portion 147 of the crankshaft 140 by means of the connecting rod or pitman 151. This arrangement is best shown in Figure 5 of the drawings. The cross head 150 is of the convenient configuration shown in the drawings and is adapted to straddle the cross head guide 152 which is supported by the brackets 153 which may be formed integrally with the bottom wall 110 of the bed frame. A plate 155 serves to connect the side walls of the cross head 150 beneath the guide 152, and wear plates 156 are inserted between portions of the cross head 150 and the guide 152. A wrist pin 157 forms the pivotal connection between the cross head 150 and the pitman 151. The connection between the pitman 151 and the crank pin 147 may be most readily perceived from Figures 5 and 8 of the drawings. A bearing block 160 is formed integral with the pitman 151, and a mating bearing member 161 is provided with arms 162 adapted to embrace the block 160.

Bolts 163 are employed to connect mating bearing members 161 with the pitmen 151. Bearing brasses 165 are inserted between the crank 147 and the bearing halves 160 and 161.

The valve motions for controlling the admission and cut-off events of the engine cycle may be described as follows. The piston valve rod 101, to which reference has already been made, is threaded at its rear end into a socket in the member 168, which is provided with a rearward extension guided in the bracket 169. An upwardly projecting portion 170 is formed on the member 168. A pivot pin 171 is provided in each end of the crankshaft 140 and is disposed eccentrically therewith. A link 172 is adapted to connect the pin 171 and the projecting portion 170 of the member 168 carried by the valve rod 101. By this means the piston valve 92 is moved within its valve chamber 94 for controlling the flow of steam to the associated cylinder. Proper adjustment of the valve may be made by rotating the piston rod 101 relatively to the member 168 to which it is threaded.

It will be noted from the foregoing descriptions that the various elements of the valve motion are disposed in longitudinal alignment with the piston valves and their chambers, as are also the crank pins, connecting rods, and cross heads with the pistons and cylinders of the engine, and all of these motion transmitting elements are disposed conveniently beneath the axle 21 and within their respective compartments provided in the bed frame and clearly shown in the cross-sectional view in Figure 7.

The entrainment of the auxiliary propulsion unit with the axle 21 is accomplished by the complete intermeshing of the tumbler 145 with the driving pinion 143 of the crankshaft and with the bull gear 142 of the axle. As shown in Figure 4 of the drawings, the gear 145, when the unit is in its inoperative condition, is completely demeshed from the axle gear 142 and only partially in meshing engagement with the driving gear 143. It is desirable that the intermeshing or entrainment of the device be accomplished nearly simultaneously with the admission of steam to the engine cylinders.

The tumbler gear 145 is provided with a pin or axle 175, the extended ends of which form trunnions which are adapted to be guided in the combined guide, bearing, and stop members 176 formed on the inner webs 115 and arranged tangentially to both gears 142 and 143. Caps 177 are bolted to the open ends of these guide portions to limit the outward movement of the axle 175.

It will be readily seen that if its downward motion within the guides 176 is permitted, the gear 145 will move into complete mesh with both the driven and driving pinions 142 and 143 under the influence of the force of gravity and, to some extent, if pinion 143 is rotating, of tooth pressure. Consequently the provision of means for removing the gear from meshing engagement with the driving and driven gears upon de-energization of the auxiliary propulsion unit and maintaining this gear in inoperative position, must be provided. The mechanism provided by the present invention for effecting entrainment and disentrainment comprises a toggle arrangement which is adapted to be actuated simultaneously with the opening and closing of the steam admission valve 76, which also performs the function of a motor for actuating the toggle mechanism. Another feature of this toggle arrangement is the provision of means for locking the same in order to prevent the descent of the tumbler gear 145 when the propulsion unit is idle, at times either when the locomotive is stationary or when traveling at speeds and under circumstances when the auxiliary propulsion unit is not being employed.

A plunger 180 is mounted for reciprocation in the guide 181 which is supported by the webs 182 between the inner walls or partitions 115 of the bed frame. This plunger and guide are disposed at an oblique angle, as shown in Figure 4, directly in the path of the axis of the tumbler gear 145 as it moves in the guides 176. The plunger 180 is provided with a head 183 for contacting the idler gear 145 and is provided with the ears 186 between which is pivotally received the toggle member or link 187. This link 187 is connected to the parallel arms 190 of a bell crank lever 191 by means of the rule joint 192. The bell crank 191 is pivoted on the bracket 193 which is secured to the bottom wall 110 of the bed frame. The other parallel arms 194 of the bell crank 191 are connected to the end 195 of plunger 77 by means of the pin and slot connection 196.

The operation of this entrainment arrangement will be readily understood. Upon actuating the auxiliary propulsion unit throttle valve 25, steam is admitted to the chamber 75 in advance of the piston or valve member 76 and moves this member rearwardly against the resistance of the spring 83, breaking the toggle 187, 190 and thus removing the supporting head 183 from beneath the tumbler gear 145 and permitting the tumbler gear to mesh with the bull gear 142 and the driving pinion 143. It will be noted that at the same time that this is being accomplished, the valve member 76 is moving to open the port 85 through which the steam is admitted to the engines. The valve is set so as to begin the opening of the port 85 approximately at the time the idler gear reaches face-to-face position with respect to the bull gear. However, the opening of the port may be timed with respect to the action of the idler gear so as to admit steam at any position of the idler or tumbler gear in its meshing travel.

Demeshing is accomplished as follows. When the steam supply is shut off by closing the throttle 25, the spring 83 operates to return the valve and piston 76, 77 to its initial forward position wherein the port 85 is closed, thus bringing the toggle 187, 190 back to the position shown in Figure 4 and pushing the tumbler gear 145 out of meshing engagement with the gear 142. The rule joint 192 prevents the toggle from moving beyond aligned position, and it will be understood that the toggle in this position effectively and positively locks the entrainment mechanism in its disengaged position.

The proper lubrication of the moving parts of the transmission of the auxiliary propulsion unit is accomplished by the splash system, whereby a quantity of oil or other suitable lubricant is contained within the bed frame compartments at a proper level and is suitably distributed by the movement of certain of the elements which are immersed therein. The oil is maintained at the proper level in all compartments by means of the openings 129 provided in the walls thereof, and, of course, the cover 114 prevents the loss of lubricant from the top of the bed frame. All of the openings in the dividing wall 63 are suitably packed both to prevent the escape of steam from the power end of the unit and the passage of lubricating fluid from the transmission end.

It will be understood that various changes and modifications may be made in the embodiments illustrated and described herein without departing from the scope of the invention as defined in the following claims.

Having thus described the invention, what is claimed as new and desired to be secured by Letters Patent is:

1. In combination with a six-wheeled lateral motion truck, including three spaced axles, a substantially rectangular frame, a swing bolster, and a pair of spaced transoms from which said swing bolster is suspended, said transoms being disposed between the intermediate and one of the outside axles respectively, an auxiliary propulsion unit mounted on one of said outside axles and substantially occupying the space defined in one direction by the wheels on said axle and in the other direction by the adjacent end of said truck frame and the adjacent transom.

2. In combination with a conventional six-wheeled truck for railway rolling stock having three equally spaced axles and side and end frames, an auxiliary propulsion unit mounted on one of the outside axles, one end of said unit being disposed substantially beneath the adjacent end frame and the other end terminating short of the intermediate axle.

3. In a locomotive tender construction, in combination, a conventional six-wheeled lateral motion tender truck having three equally spaced axles, and an auxiliary propulsion unit mounted on and operatively connected with the forward axle of said truck and terminating short of the intermediate axle thereof.

4. In combination with a six-wheeled swing motion truck having a substantially rectangular frame including transoms disposed between the intermediate and outside axles and parallel thereto, an auxiliary propulsion unit mounted on one of said outside axles at laterally spaced points and operatively associated therewith, and a supporting link pivotally connecting one end of said unit and the adjacent transom.

5. In an auxiliary propulsion unit for locomotives or the like, a one-piece crank and pinion shaft adapted to be disposed transversely of the unit and being provided centrally with gear teeth for operative connection with an axle and upon either side thereof outwardly from the center, a counterweight, a crank pin, another counterweight, a bearing portion, and a valve motion connection, in the order named, said counterweights and crank pins on either side of the center of said shaft extending radially of said shaft in directions 90° apart.

6. An auxiliary propulsion unit for locomotives or the like comprising a motor frame provided with means disposed substantially centrally thereof for mounting the frame upon an axle to be driven by said unit, a steam power cylinder for said motor in the frame at one side of said axle, a crankshaft at the opposite side of said axle, and operative connections between said cylinders and said crankshaft and between said crankshaft and said axle.

7. In combination with a truck for railway rolling stock having a rectangular frame and spaced axles, an auxiliary propulsion unit comprising a motor frame mounted on one of said axles for driving the same, one end of said motor frame being disposed approximately beneath one end of said truck frame and the other end of said motor frame terminating short of the longitudinal center of said truck, steam cylinders in said motor frame upon one side of said one of said axles, and transmission means in said motor frame on the opposite side of said one of said axles.

8. In combination with a six-wheeled swing motion tender truck having a frame mounted on three spaced axles, transoms each positioned between one of the outside axles and the intermediate axle, and a swing bolster suspended from said transom; an auxiliary propulsion unit mounted on the forward axle in driving relation therewith and approximately centrally of the length of said unit, the front end of said unit disposed approximately at the forward end of the truck frame and the rear end of said unit disposed approximately beneath the front transom and suspended therefrom, power cylinders in said motor frame forwardly of said axle, and a crankshaft in said motor frame rearwardly of said axle.

9. An auxiliary propulsion unit for locomotives or the like comprising, in combination, a motor frame provided with bearings centrally thereof for receiving an axle, a power cylinder in said frame on one side of said axle, a crankshaft on the opposite side of said axle and adapted to be operatively engaged therewith, and operative connections between said cylinder and crankshaft disposed beneath and extending from one side of said axle to the other, said connections comprising a connecting rod, a piston rod, and a cross head.

10. An auxiliary propulsion unit for lomomotives or the like comprising, in combination, a motor frame mounted at spaced bearing points upon an axle to be driven, a gear carried by said axle centrally thereof, a crankshaft disposed transversely of said frame and provided with a driving gear at the mid-portion thereof, a tumbler gear meshing with said driving gear and adapted to engage with said axle gear during operation of said unit, and a toggle adapted to be extended and broken for retaining said tumbler gear in disengaged position and permitting it to engage said axle gear respectively.

11. An auxiliary propulsion unit for locomotives or the like comprising, in combination, a motor frame mounted at spaced bearing points upon an axle to be driven, a gear carried by said axle centrally thereof, a crankshaft disposed transversely of said frame and provided with a driving gear at the mid-portion thereof, a tumbler gear meshing with said driving gear and adapted to engage with said axle gear during operation of said unit, means for controlling the entrainment of said gearing disposed along the longitudinal center line of said unit, counterweighted crank pins formed on said crankshaft immediately outwardly of said driving gear, power cylinders in said frame operatively connected with said crank pins, ball bearing assemblies carried by said frame and adapted to receive said crankshaft outwardly of said crank pin and valve motion connections on said shaft outwardly of said bearings.

12. An auxiliary propulsion unit for locomotives or the like comprising a motor frame operatively connected with an axle to be driven, a transmission housing at one end of said frame and the opposite or power end of said frame formed with a central steam admission housing, cylinders on either side of said housing, and steam valve chambers disposed outwardly of said cylinders.

13. An auxiliary propulsion unit for locomotives or the like comprising a motor frame operatively connected with an axle to be driven, a transmission housing at one end of said frame and the opposite or power end of said frame formed with a central steam admission housing, cylinders on either side of said housing, steam valve chambers disposed outwardly of said cylinders, a casing providing communication between said admission housing and said valve chambers around each of said cylinders, separate exhaust casings adjacent each valve chamber, and a valve in said admission housing for controlling the admission of steam to said unit.

14. An auxiliary propulsion unit for locomotives or the like comprising a motor frame operatively connected with an axle to be driven, a transmission housing at one end of said frame and the opposite or power end of said frame formed with a central steam admission housing, cylinders on either side of said housing, steam valve chambers disposed outwardly of said cylinders, a casing providing communication between said admission housing and said valve chambers above each of said cylinders, and separate exhaust casings above each valve chamber.

15. In combination with a locomotive tender, an auxiliary propulsion unit mounted on one of the trucks thereof, a steam engine forming a part of said unit, a flue passing through the water tank of said tender from the bottom to the top thereof, and an exhaust pipe leading from said engine, terminating slightly short of and arranged to discharge exhaust steam into the open lower end of said flue, said flue being of somewhat larger diameter than said exhaust pipe to accommodate such lateral movement of the latter as may occur during movement of the rolling stock.

16. In an auxiliary propulsion unit for locomotives or the like, in combination, a motor frame having steam cylinders and associated intake, exhaust, and valve chambers at one end thereof, a bed frame for supporting and enclosing the transmission elements, bearings in said bed frame for an axle and a crankshaft, a train of gearing adapted to operatively connect said axle and said crankshaft disposed centrally of said unit, a steam admission housing disposed centrally of said cylinders, a control valve in said housing, means disposed in longitudinal alignment with said gearing and said valve for actuating said valve and controlling the entrainment of said gearing, crank pins on said crankshaft immediately outwardly of said gearing and in longitudinal alignment with said cylinders, pistons in said cylinders and driving connections between said pistons and crank pins, valve motion connections on said crankshaft outwardly of said crank pins, the steam valve chambers being disposed outwardly of said cylinders, steam valves in said chambers, and valve motions between said valves and said connections on said crankshaft being in longitudinal alignment.

17. In an auxiliary propulsion unit for locomotives or the like, in combination, a motor frame comprising an integral casting including steam cylinders and associated intake, exhaust, and valve chambers at one end thereof, a bed frame for supporting and enclosing the transmission elements, bearings in said bed frame for an axle and a crankshaft, a train of gearing adapted to operatively connect said axle and said crankshaft disposed centrally of said unit; a steam admission housing disposed centrally of said cylinders, a control valve in said housing, means disposed in longitudinal alignment with said gearing and said valve for actuating said valve and controlling the entrainment of said gearing, crank pins on said crankshaft immediately outwardly of said gearing and in longitudinal alignment with said cylinders, pistons in said cylinders and driving connections between said pistons and crank pins, the bearings for said crankshaft being disposed next outwardly of said crank pins, valve motion connections on said crankshaft outwardly of said bearings, the steam valve chambers being formed outwardly of said cylinders, steam valves in said chambers, and valve motions between said valves and said connections on said crankshaft being in longitudinal alignment.

18. In an auxiliary propulsion unit for locomotives or the like, a substantially rectangular bed frame having bottom, front, rear, and side walls, a pair of vertically extending laterally spaced webs formed upon the bottom wall of said frame, bearing pillows formed upon said webs at intermediate portions spaced from the ends thereof for the reception of an axle to be driven by said unit, bearing pillows formed on said webs for the reception of a crankshaft for transmitting power to said axle, and roller bearing assemblies carried by said bearing pillows.

19. In an auxiliary propulsion unit for locomotives or the like, a substantially rectangular bed frame having bottom, front, rear, and side walls, a pair of vertically extending laterally spaced webs formed upon the bottom wall of said frame, bearing pillows formed upon said webs at intermediate portions spaced from the ends thereof for the reception of an axle to be driven by said unit, bearing pillows formed on said webs for the reception of a crankshaft for transmitting power to said axle, each of said axle bearing pillows being integrally connected with a portion of the adjacent side wall by means of a half sleeve, bearing cap members associated with said pillows and formed with complementary bearing receiving portions and half sleeve portions adapted to enclose said axle, and packing elements disposed within the sleeves so formed.

20. In an auxiliary propulsion unit for locomotives or the like, provided with cylinders and associated steam and valve chambers at one end and also provided with a transverse crankshaft and adapted to be mounted on an axle which is to be driven thereby through suitable disengageable gearing; a bed frame having bottom, end, and side walls, a pair of laterally spaced vertical webs formed on said bottom wall and spaced inwardly from the side walls and forming compartments for the reception of valve motions connecting the crankshaft and valve chambers, another pair of laterally spaced vertical webs formed on said bottom wall inwardly of said first named webs, compartments formed between each of said first named webs and its adjacent last named web for the reception of the crank pins, connecting rods, piston rods, and cross heads for transmitting power from said cylinders to said crankshaft, the remaining centrally located compartment enclosed between said last named webs adapted to receive the gearing through which said axle is driven by said crankshaft, and mechanism for disengaging said gearing.

21. In an auxiliary propulsion unit for locomotives and the like, an integrally constructed bed frame comprising bottom, end, and side walls, four laterally spaced vertical webs formed on said bottom wall and connecting said end walls, and a transverse web connecting the two inner longitudinal webs, said webs forming lubricant containing compartments within which moving parts of said unit are adapted to be received, said lubricant to be distributed by splashing of the moving parts of said unit therein, and openings in the forward portion of the two outer webs, in the rearward portion of the two inner webs, and in said transverse web, for the flow of lubricant.

22. In an auxiliary propulsion unit for locomotives or the like, an integrally formed motor frame comprising cylinders and associated steam and valve chambers at one end of said frame, a transmission receiving bed frame at the other end of said frame, a transverse wall separating said cylinders and chambers from the transmission bed, and six laterally spaced parallel vertical webs formed on said bed frame and providing compartments for the reception of certain moving parts of the transmission.

23. In an auxiliary propulsion unit for locomotives or the like, an integrally formed motor frame comprising cylinders and associated steam and valve chambers at one end of said frame, a transmission receiving bed frame at the other end of said frame, a transverse wall separating said cylinders and chambers from the transmission bed, six laterally spaced vertical webs formed on said bed frame and providing compartments for the reception of certain moving parts of the transmission, and a transverse web connecting the two innermost longitudinal webs.

24. In an auxiliary propulsion unit for locomotives or the like, an integrally formed motor frame comprising at one end steam cylinders and their associated steam valve chambers and at the other end a bed frame for transmission elements, laterally spaced webs formed on said bed frame and dividing it into a central, two intermediate, and two outer compartments, a transverse vertical wall separating said cylinder end from said transmission bed frame, and openings through said transverse wall each communicating with one of said five compartments.

25. In an auxiliary propulsion unit for locomotives or the like, an integrally formed motor frame comprising at one end steam cylinders and their associated steam valve chambers and at the other end a bed frame for transmission elements, laterally spaced webs formed on said bed frame and dividing it into a central, two intermediate, and two outer compartments, a transverse vertical wall separating said cylinder end from said transmission bed frame, an opening through said transverse wall communicating with said central compartment, a tubular housing surrounding said opening and projecting into said central compartment, openings through said wall affording communication between the two intermediate compartments and the cylinders, and other openings in said wall affording communication between the valve chambers and said two outer compartments.

26. In an auxiliary propulsion unit for locomotives or the like, a motor bed frame having bottom, side, front, and rear walls, said rear wall being recessed for the accommodation of the movements of a supporting link, and attaching brackets at the lower portion of said rear wall for the lower end of such link.

27. In an auxiliary propulsion unit for locomotives or the like, an integrally formed motor frame comprising at one end steam cylinders and their associated steam valve chambers, and at the other end a bed frame for transmission elements, a transverse vertical wall separating said cylinder end from transmission bed frame, an opening through said transverse wall communicating with said central compartment and a tubular housing surrounding said opening and projecting into said central compartment, a transmission entraining rod adapted to reciprocate in said chamber between said steam cylinder end and said transmission end of the frame, a stop on said rod, and a coil spring surrounding said rod and adapted to be compressed between one end of said tubular housing and said stop to urge said rod toward disentrainment position.

28. In an auxiliary propulsion unit for locomotives or the like, a motor, a driving gear actuated by said motor, a gear on the axle to be driven, a tumbler gear adapted to be continually substantially in mesh with said driving gear and to be urged toward meshing engagement with the driven gear, and means operable to prevent entrainment of said gearing comprising a reciprocable member disposed in the line of movement of said tumbler gear and adapted to contact therewith and a toggle mechanism for reciprocating said member.

29. In an auxiliary propulsion unit for locomotives or the like, a steam engine, a driving gear actuated by said engine, a gear on the axle to be driven, a tumbler gear adapted to be continually substantially in mesh with said driving gear and to be urged by gravity toward meshing engagement with the driven gear, and means operable to prevent entrainment of said gearing comprising a reciprocable member disposed in the line of movement of said tumbler gear and adapted to contact therewith, and a steam actuated toggle mechanism for reciprocating said member.

30. In an auxiliary propulsion unit for locomotives or the like, a steam engine, a driving gear actuated by said engine, a gear on the axle to be driven, a tumbler gear adapted to be continually substantially in mesh with said driving gear and to mesh with the driven gear when the unit is brought into auxiliary driving relation with the locomotive, means for controlling the entrainment of said gear comprising a reciprocable member, a guide therefor on a portion of the frame, a toggle connected to said member and operable to reciprocate said member in said guide, a plunger for actuating said toggle, and means for associating said plunger with the steam engine whereby said toggle may be broken to establish entrainment of the gearing and extended to disentrain it at the proper points during the admission and cutting off of the supply of steam to said engine.

31. In an auxiliary propulsion unit of the class described, in combination, an axle to be driven, a gear on said axle, a driving gear, and a tumbler gear disposed with its axis above that of the driving gear and adapted to be substantially in mesh at all times with said driving gear and to be brought into meshing engagement with said axle gear to entrain the auxiliary unit, and a toggle device arranged beneath the tumbler gear and adapted to contact therewith to move the same out of meshing engagement with said axle gear.

32. In an auxiliary propulsion unit of the class described, in combination, an axle to be driven disposed substantially centrally thereof, engine cylinders on one side of said axle, a transmission bed frame disposed beneath and on the opposite side of said axle, a driven gear on said axle, a driving gear on said opposite side of the axle, driving connections between said cylinders and driving gear, a pair of members on said bed frame provided with bearing and guide slots, a tumbler gear trunnioned in said slots so as to move into and out of mesh with said axle gear while remaining at all times in substantially meshing engagement with said driving gear, a member adapted to be positioned beneath said gear in the path of movement of said gear in said slots, a guide for said member on said bed frame and aligned with said slots, means for moving said member, means for controlling the admission of steam to said engine cylinders, and operative connections between said last two means.

33. In a high-speed auxiliary propulsion unit of the class described, in combination, a relatively short motor frame mounted on one of the axles of a truck and terminating approximately midway between said axle and an adjacent axle; a steam engine in said frame comprising a crankshaft adapted to be operatively connected with said first named axle, a connecting rod, a cross head, and a piston for rotating said crankshaft; and a steam cylinder within which said piston reciprocates, the lengths of stroke of said piston being considerably smaller than the diameters of said piston and cylinder, whereby the overall length of said unit may be reduced for the purpose described.

34. The combination with a truck having three parallel supporting axles and transom members intermediate said axles, of a central bearing plate formed separately from the truck, means located substantially within the central area included between the transom members for supporting said plate for limited lateral movement, a fluid pressure driven propulsion unit being mainly supported upon one of the outer axles and located entirely without the central area occupied by said means, and means for flexibly connecting said unit to an adjacent one of said transom members.

35. In an auxiliary propulsion unit for locomotives or the like, a motor, a transmission system comprising a driving gear actuated by said motor, a gear on the axle to be driven, a tumbler gear adapted to be continually substantially in mesh with said driving gear and to be continually urged toward meshing engagement with the driven gear, the sole controlling means for said transmission system being a member operable to prevent or enable the entrainment of said gearing and reciprocable in the line of movement of said tumbler gear and adapted to contact therewith and means for reciprocating said member.

36. In an auxiliary propulsion unit of the class described, in combination, an axle to be driven, a gear on said axle, a driving gear, and a tumbler gear disposed with its axis above that of the driving gear and adapted to be substantially in mesh at all times with said driving gear and to be brought into meshing engagement with said axle gear to entrain the auxiliary unit, and a member arranged beneath the tumbler gear and adapted to be brought into contact therewith to move the same out of meshing engagement with said axle gear.

37. The combination of a railway vehicle including a truck of the present conventional six wheel, swing motion type, with a fluid pressure driven auxiliary propulsion unit having horizontally disposed cylinders, applied thereto without modification of said truck, said truck having three equally spaced wheel supported axles, and a substantially rectangular frame carried thereby, said frame including intermediately disposed transoms, and end beams, all in substantially horizontal alignment, a center bearing and a swing bolster supporting the same, means for suspending said bolster from the transoms, said auxiliary propulsion unit being mainly supported by and operatively connected with one of the end axles and spaced horizontally from said bolster, and supplemental means associated with said vehicle for providing additional support for said unit.

38. The combination of a railway truck of the present conventional six wheel, swing motion type, with a fluid pressure driven auxiliary propulsion unit having horizontally disposed cylinders, applied thereto without modification of said truck, said truck having three equally spaced wheel supported axles, and a substantially rectangular frame carried thereby, said frame including intermediately disposed transoms, and end beams, all in substantially horizontal alignment, and symmetrically disposed with respect to the intermediate axle, a center bearing and a swing bolster supporting the same, and means for suspending said bolster from the transoms, said auxiliary propulsion unit being carried by and operatively connected with one of the end axles and spaced horizontally from said bolster, and means remote from the adjacent end beam for connecting said unit with said truck frame.

39. The combination of a railway vehicle including a truck of the present conventional six wheel, swing motion type, with a fluid pressure driven auxiliary propulsion unit having horizontally disposed cylinders, applied thereto without modification of said truck, said truck having three equally spaced wheel supported axles, and a substantially rectangular frame carried thereby, said frame including intermediately disposed transoms and end beams, all in substantially horizontal alignment, a center bearing and a swing bolster supporting the same, and means for suspending said bolster from the transoms, said auxiliary propulsion unit being suitably supported from said vehicle and operatively connected with one of said axles and substantially completely confined within the outline of said truck.

JOHN A. McGREW.